United States Patent [19]
Nakazawa et al.

[11] Patent Number: 6,024,424
[45] Date of Patent: Feb. 15, 2000

[54] BRAKING DEVICE

[75] Inventors: Chiharu Nakazawa, Kawasaki; Masatoshi Iyatani, Kanagawa, both of Japan

[73] Assignee: Unisia Jecs Corporation, Atsugi, Japan

[21] Appl. No.: 09/047,342

[22] Filed: Mar. 25, 1998

[30] Foreign Application Priority Data

Mar. 25, 1997 [JP] Japan ................................. 9-070960

[51] Int. Cl.7 ................................................. B60T 8/40
[52] U.S. Cl. .................. 303/116.1; 303/11; 303/DIG. 1; 303/DIG. 2; 137/529
[58] Field of Search ............................ 303/115.4, 116.1, 303/116.2, 113.2, 140, 146, 84.1, 10, 11, DIG. 1, DIG. 2; 137/529

[56] References Cited

U.S. PATENT DOCUMENTS

| | | | |
|---|---|---|---|
| 4,618,189 | 10/1986 | Nakanishi et al. | 303/115.4 |
| 5,015,043 | 5/1991 | Resch | 303/100 |
| 5,076,647 | 12/1991 | Grana et al. | 303/113.2 |
| 5,330,258 | 7/1994 | Hoshoya et al. | 303/115.4 |
| 5,472,268 | 12/1995 | Ando et al. | 303/116.2 |
| 5,857,754 | 1/1999 | Fukami et al. | 303/140 |

*Primary Examiner*—Matthew C. Graham
*Assistant Examiner*—Mariano Sy
*Attorney, Agent, or Firm*—Foley & Lardner

[57] ABSTRACT

A braking system comprises a main pump supplying a fluid pressure to an intermediate circuit section between a master cylinder and a wheel cylinder, a fluid pressure control valve controlling wheel cylinder brake fluid pressure. By driving the pump and controlling the valve, a control unit controls the braking force independently of the driver's brake operation to achieve a vehicle stability control. A relief valve is disposed in a relief circuit bypassing a gate valve between the master cylinder and the wheel cylinder. The relief valve has a movable valve element having an opening pressure receiving portion for receiving a downstream pressure of the gate valve, and a closing pressure receiving portion receiving a fluid pressure in a closing pressure chamber. The closing pressure chamber is separated from the relief circuit, and the pressure in the closing pressure chamber is independent of the pressure in the relief circuit.

17 Claims, 3 Drawing Sheets

BRAKING DEVICE

BACKGROUND OF THE INVENTION

The present invention relates to a braking device and more specifically to a braking device performing a motion stabilizing control generating a braking force to improve the stability of a vehicle in accordance with vehicle running conditions when a driver is not performing a brake operation.

A conventional example of the above-mentioned braking device is shown in U.S. Pat. No. 5,015,043 issued to Resch (Japanese Examined (KOKOKU) Publication No. 7(1995)-80445).

The conventional braking device has an anti-lock brake system for preventing wheel lock. The anti-lock brake system comprises a fluid pressure control valve and a return pump. The fluid pressure control valve comprises an inlet valve and an outlet valve. The inlet valve and outlet valve control a wheel cylinder pressure in a brake circuit. The brake circuit connects a master cylinder with a wheel cylinder. The return pump returns the brake fluid drained from the outlet valve to an upstream section (which is closer to the master cylinder than the fluid control valve). In this conventional braking device, a pressure pump is arranged for supplying the brake fluid of the master cylinder to the suction side of the return pump. A normally-closed inlet control valve which is opened during the motion stabilizing control is arranged in a suction circuit for connecting the pressure pump with the master cylinder. A normally-closed gate valve which is closed during the motion stabilizing control is arranged between the fluid pressure control valve and the master cylinder. A relief valve is arranged in a bypass circuit arranged in parallel with the gate valve. The relief valve relieves the fluid pressure of the fluid pressure control valve's side into the master cylinder's side by opening the relief bypass circuit when the fluid pressure of the fluid pressure valve's side in the brake circuit is higher than the fluid pressure of the master cylinder's side.

However, the above-mentioned conventional braking device has a following problem, because the relief valve is opened by a differential pressure between the brake fluid pressure of the downstream side (the wheel cylinder's side) of the relief valve of the brake circuit and the brake fluid pressure of the upstream side (the master cylinder's side) of the relief valve.

For example, the motion stabilizing control is a control for controlling drive wheel slip or for improving directional stability of a vehicle by controlling braking forces. The control system restrains drive wheel slippage by generating a braking force on one or more drive wheels, and generates a yaw moment in a direction to stabilize the vehicle motion during cornering by generating a braking force on one or more wheels. In these situations, a driver usually does not apply a brake. Therefore, a brake fluid pressure for this brake control operation is generated in such a manner that an auxiliary supercharging pump supplies the brake fluid from the master cylinder to the return pump, the return pump supplies the brake fluid to the upstream side of the fluid pressure control valve of the brake circuit and the fluid pressure control valve supplies the brake fluid pressure into a wheel cylinder of a desired wheel. In this case, because the inlet control valve is opened and the gate valve is closed, the brake circuit section into which the brake fluid is discharged from the return pump is closed by the fluid pressure control valve, the gate valve and the relief valve. If a pressure difference between the fluid pressure of this circuit section and the fluid pressure of the upstream side of the brake circuit becomes higher than a predetermined pressure, the relief valve is opened to protect the brake circuit by relieving the fluid pressure toward the master cylinder.

However, when the driver applies a brake during the motion stabilizing control, the driver's operation increases the master cylinder pressure and exerts influence on the characteristic of the relief valve responsive to the pressure difference between the upstream and downstream sides. The increase in the master cylinder pressure increases the valve opening pressure (or cracking pressure) at which the relief valve is opened. This increase of the valve opening pressure increases the load on the return pump, increases the required capacity of the motor to meet the increase of the load, increases the required pressure tightness of the control valve and the fluid pressure control valve, and eventually increases the system size and manufacturing cost.

SUMMARY OF THE INVENTION

It is an object of the present invention to provide a braking device or system capable of preventing undesired increase of a load on pumps and valves and advantageous in size and cost.

According to the present invention, a braking device comprises:
- a fluid pressure source for generating a brake fluid pressure according to a driver's brake operation;
- a brake actuating part for applying a braking force to a wheel by the fluid pressure source generating fluid pressure and transmitting fluid pressure through a brake circuit;
- a fluid pressure control valve, arranged in the brake circuit, capable of decreasing, holding and increasing brake fluid pressure of the brake actuating part;
- a pump for returning brake fluid reserved in a reservoir arranged in a drain circuit in which brake fluid is drained when the fluid pressure of the fluid pressure control valve is decreased into an upstream part of the fluid pressure control valve of the brake circuit;
- a suction circuit for connecting a suction side of the pump with a brake fluid source;
- an IN-side gate valve for opening and closing the suction circuit;
- an OUT-side gate valve, arranged between a discharge position of the pump and the fluid pressure source in the brake circuit, for opening and closing the brake circuit;
- a relief circuit which comprises a relief valve bypassing the OUT-side gate valve, arranged in parallel with the brake circuit, for relieving fluid pressure on the fluid pressure control valve side of the OUT-side gate valve into the fluid pressure source side of the OUT-side gate valve; and
- a control unit for controlling the pump, the fluid pressure control valve, the IN-side gate valve and the OUT-side gate valve;
- wherein the control unit opens the IN-side gate valve, closes the OUT-side gate valve, generates brake fluid pressure by driving the pump regardless of the driver's brake operation, controls the fluid pressure of the brake operation part by the fluid pressure control valve at a predetermined pressure and performs motion stabilizing control stabilizing a vehicle behavior when a predetermined vehicle behavior is detected;
- wherein the relief valve comprises a valve element for opening and closing the relief circuit by changing from a closing condition in which a seat is engaged with a ball valve to an opening condition in which the seat is disengaged with the ball valve;

wherein the valve element comprises an opening pressure receiving part receiving fluid pressure on the fluid pressure control valve's side of the relief circuit in a direction of opening the valve and a closing pressure receiving part receiving pressure in a direction of closing the valve;

wherein a spring urges the valve element in a direction of closing the valve; and wherein the closing pressure receiving part faces a closing valve chamber separated from the relief circuit in a fluid-tight condition.

For example, the closing valve chamber may be in communication with the atmosphere, or a closed gaseous chamber.

During the motion stability control for improving the stability of the vehicle, the suction side of the pump is connected with the fluid source by opening the IN-side gate valve and a line between the fluid pressure source and the fluid pressure control valve is shut off by closing the OUT-side gate valve. Under these conditions, the pump is operated to increase the fluid pressure in the intermediate fluid circuit section between the OUT-side gate valve and the fluid pressure control valve by discharge the brake fluid of the fluid source to the intermediate circuit section. The fluid pressure control valve supplies the fluid pressure to the brake actuating part of a selected wheel and generates a braking force to stabilize the vehicle posture.

In this case, if the fluid pressure in the intermediate circuit section between the OUT-side gate valve and the fluid pressure control valve is higher than a predetermined pressure, the relief valve opens the relief circuit and relieves the high pressure to the fluid pressure source's side. However, in this case, the pressure of the fluid pressure source's side has to be lower.

The relief valve receives the fluid pressure of the fluid pressure control valve's side in the direction of opening the valve at the opening valve pressure receiving part. The relief valve, on the other hand, receives the pressure in the closing chamber in the direction of closing the valve at the closing valve pressure receiving part and further receives the resilient force of the resilient means. Thus, if the opening valve force received at the opening valve pressure receiving part is greater than a resultant force of the closing valve force received at the closing valve pressure receiving part and the resilient force generated by the resilient means, the valve is opened. The resilient force generated by the resilient means is not influenced by the fluid pressure of the upstream side of the relief circuit. Because the closing chamber is demarcated from the relief circuit in the fluid-tight manner, the closing chamber is not influenced either by the fluid pressure of the upstream side of the relief circuit. Thus, the opening valve pressure of the relief valve remains constant regardless of generation of fluid pressure in the fluid pressure source.

When the closing chamber is open to the atmosphere, the pressure in the closing chamber is held constant during a stroke of the valve element, so that the valve closing force is also constant. When, however, the closing chamber is closed, the pressure in the closing chamber becomes higher and the valve closing force increases as the valve element strokes, and the amount of stroke increases.

DETAILED DESCRIPTION OF THE INVENTION

The following is an explanation of one embodiment of the present invention with reference to the drawings.

Figure 1:
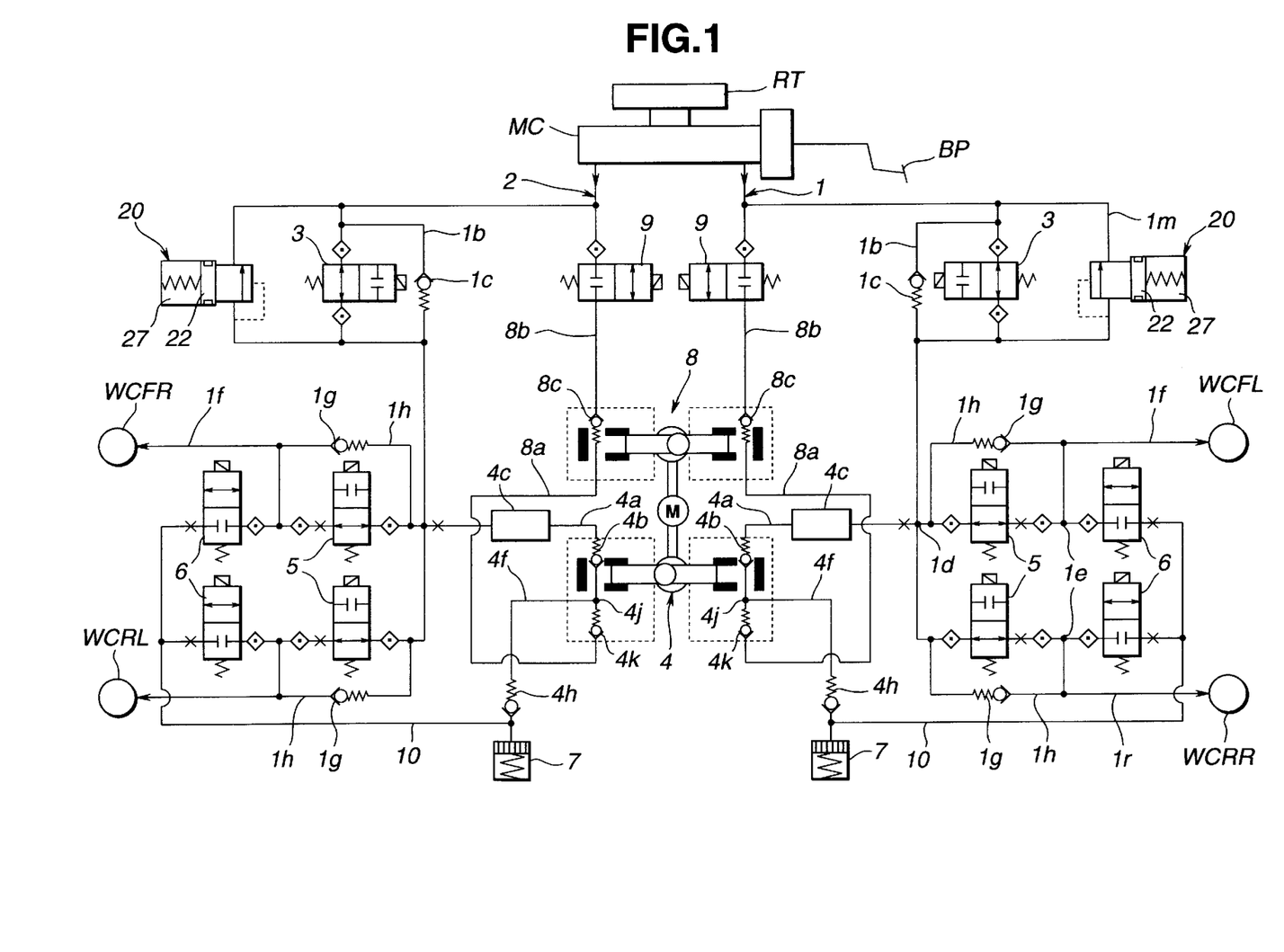
FIG. 1 is a schematic view showing a braking device according to an embodiment of the present invention.

FIG. 1 shows a brake system according to the embodiment. In FIG. 1, there are provided a wheel cylinder WCFL of a front-left wheel, a wheel cylinder WCRR of a rear-right wheel, a wheel cylinder WCFR of a front-right wheel, a wheel cylinder WCRL of a rear-left wheel and a master cylinder MC as a fluid pressure source supplying fluid pressure to every wheel cylinder WCFL~RL. The master cylinder MC supplies, in accordance with depression of a brake pedal BP, fluid pressure to a brake circuit BR. The master cylinder MC comprises a reservoir tank RT for storing brake fluid.

The brake circuit BR is in the form of a two channel circuit. The two channel circuit comprise a first channel circuit 1 and a second channel circuit 2. The first channel circuit 1 is connected to the wheel cylinders of the front-left wheel WCFL and the rear-right wheel WCRR. The second channel circuit 2 is connected to the wheel cylinders of the front-right wheel WCFR and the rear-left wheel WCRL. The first and second channel circuits 1 and 2 are arranged in X-piping arrangement or diagonal split arrangement. Each of the wheel cylinders WCFL~RL is denoted as WC in general.

The first and second channel circuits 1 and 2 are substantially identical in structure, and the following description is directed only to the first channel circuit 1.

The first channel circuit 1 is branched at a branch point 1d into a rear branch circuit 1r leading to the wheel cylinder of the rear-right wheel WCRR and a front wheel branch circuit 1f leading to the wheel cylinder of the front-left wheel WCFL.

Between the branch point 1d and the master cylinder MC, there are provided an OUT-side gate valve 3, a gate valve bypass circuit 1b bypassing the OUT-side gate valve 3 and a relief circuit 1m. The OUT-side gate valve 3 of this example is a normally-open two-port two-position solenoid valve putting the first channel circuit 1 in a communicating state by a spring force when not operated, and shutting off the first channel circuit 1 when operated. The gate valve bypass circuit 1b comprises a one-way valve 1c allowing only a flow in the direction from the master cylinder MC toward the wheel cylinder WC.

Hereafter the side relatively closer to the master cylinder MC is referred to as "upstream side" and the side relatively closer to the wheel cylinder WC is referred to as "downstream side". In the relief circuit 1m, there is provided a relief valve 20 for relieving a fluid pressure into the upstream side when the fluid pressure of the downstream side exceeds a predetermined pressure level. The relief valve 20 will be explained more in detail afterwards.

Each of the branch circuits 1r and 1f comprises a fluid pressure control valve for decreasing, holding and increasing the brake fluid pressure of a corresponding one of the wheel cylinders WC. In this example, the fluid pressure control valve comprises an inlet valve 5 and an outlet valve 6. The inlet valve 5 of each branch circuit 1r or 1f comprises a normally-open two-port two-position solenoid valve for holding the corresponding branch circuit 1r or 1f in the open state by the aid of a spring force when not actuated and for shutting off the corresponding branch circuit 1r or 1f when actuated. The outlet valve 6 of each branch circuit 1r or 1f comprises a normally-closed two-port two-position solenoid valve for shutting off a drain circuit 10 when not actuated and for connecting the corresponding branch circuit 1r or 1f with the drain circuit 10 when actuated. Each outlet valve 6 is disposed in a fluid passage extending from a corresponding branch point 1e located downstream of the corresponding inlet valve 5, to the drain circuit 10. The drain circuit 10 leads to a reservoir 7. Each of the branch circuits 1r and 1f comprises an inlet bypass circuit 1h bypassing the inlet valve 5 and having a one-way valve 1g allowing fluid flow only in the direction from the downstream side to the upstream side of the inlet valve 5.

The drain circuit 10 is connected with a main suction circuit 4f leading to a suction side of a main pump 4. The suction circuit 4f comprises a suction valve 4h in the form of a one-way valve for allowing the main pump 4 to suck brake fluid from the reservoir 7. A main discharge circuit 4a receiving brake fluid discharged from the main pump 4 is connected with the branch point 1d. The main discharge circuit 4a comprises a discharge valve 4b in the form of a one-way valve for preventing a counterflow and a damper 4c for absorbing a discharge ripple.

A branch point 4j in the main suction circuit 4f is connected with an auxiliary discharge circuit 8a receiving brake fluid discharged from an auxiliary (supercharging) pump 8. A suction valve 4k is arranged in the auxiliary discharge circuit 8a. During the motion stabilizing control, the auxiliary pump 8 is driven in series with the main pump 4 to supply the brake fluid from the master cylinder MC to the suction side of the main pump 4 and improves a rise of a discharge pressure of the main pump 4. An auxiliary suction circuit 8b connected with the suction side of the auxiliary pump 8 is connected with the first channel circuit 1. However, the auxiliary suction circuit 8b can be connected with the master cylinder MC or the reservoir tank RT directly. In this example, the main pump 4 and the auxiliary pump 8 are driven by a single motor M.

The auxiliary suction circuit 8b comprises an IN-side gate valve 9 and a suction valve 8c for preventing the counterflow. The IN-side gate valve 9 comprises a normally-closed two-port two-position solenoid valve for shutting off the auxiliary suction circuit 8b by a spring force when not actuated and putting the auxiliary suction circuit 8b in communication when actuated.

The following is a detailed explanation of the relief valve 20. In the relief valve 20 shown in FIG. 2, a valve element 22 is axially slidably inserted in a valve bore 21a formed in a cylinder 21. The valve element 22 in this example is in the form of a piston. The piston 22 comprises a head portion 22a with a large diameter and an elongate rod portion 22b with a small diameter. A spherical ball valve 22c is provided at the end of the head portion 22a. The ball valve 22c opens and closes a small hole 23a formed in a seat member 23 fit in the forward end portion of the valve bore 21a. The piston 22 is urged in a direction for closing the valve by a spring 24. The ball valve 22c and the seat member 23 divide the valve bore 21a into a first chamber 25 and a second chamber 26. The first chamber 25 is connected with the downstream section of the relief circuit 1m connected with the downstream side of the OUT-side gate valve 3. The second chamber 26 is connected with the upstream section of the relief circuit 1m connected with the upstream side of the OUT-side gate valve 3. The relief valve 20 relieves the fluid pressure of the first chamber 25 into the second chamber 26 by opening the hole 23a when the pressure of the first chamber 25 is high.

Figure 2:
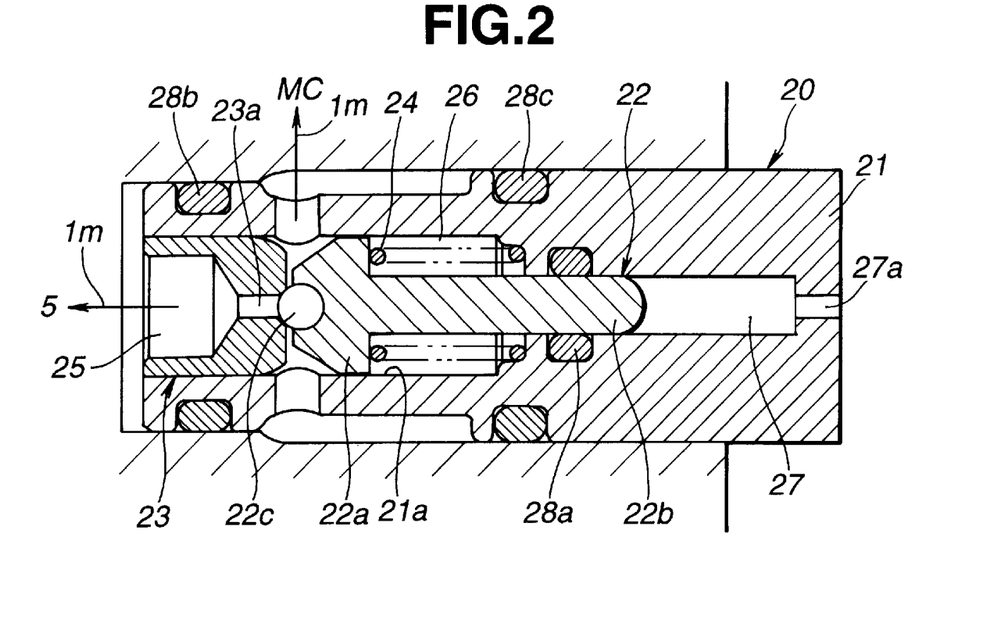
FIG. 2 is a sectional view showing a relief valve of FIG. 1.

A third chamber (closing pressure chamber) 27 is defined in the small diameter section of the valve bore 21a receiving the end portion of the rod portion 22b. The third chamber 27 of this example is in communication with the atmosphere through a small hole 27a. The third chamber is defined and demarcated by an O-ring 28a in a fluid-tight manner from the second chamber 26. The piston 22 receives the fluid pressure in the first chamber 25 with the end portion of the ball valve 22c in the direction of opening the valve and receives the atmosphere in the third chamber 27 with the end face in the direction of closing the valve. The fluid pressure in the second (or neutral) chamber 26 is balanced in the directions of opening and closing the valve. The piston 22 moves rightward and opens the relief valve 20 when the pressure of the end of the ball valve 22c is greater than a sum of the pressure of the end face of the rod portion 22b and the urging force of the spring 24. Because the force in the direction of closing valve is constant regardless of the fluid pressure of the relief circuit 1m, the valve opening pressure of the relief valve 20 is constant. In this example, the second chamber 26 is located axially between the first and third chambers.

Figure 3:
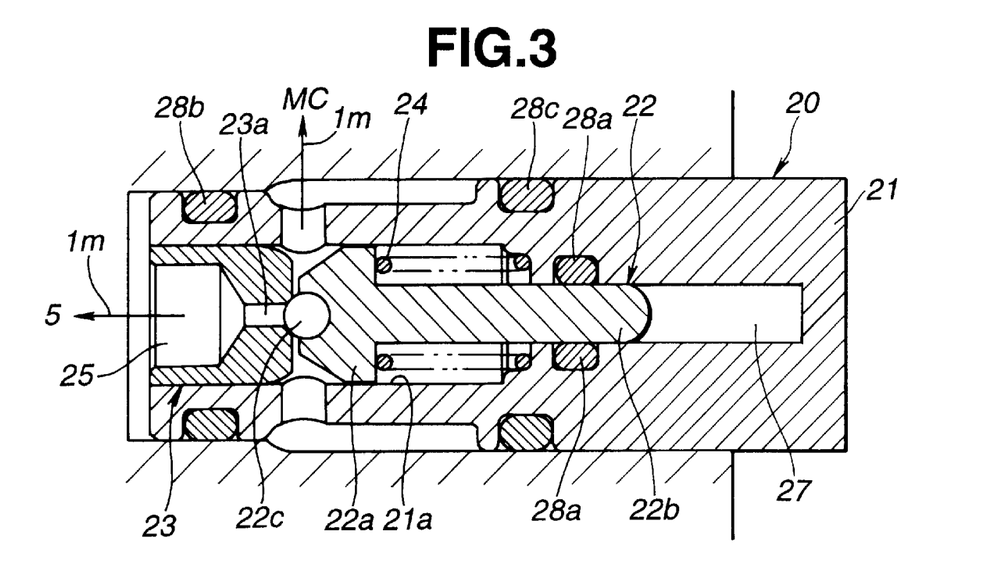
FIG. 3 is a sectional view showing another relief valve which can be used in the embodiment of the present invention.

The relief valve 20 shown in FIG. 3 is almost identical in structure to the relief valve 20 shown in FIG. 2. The relief valve 20 shown in FIG. 3 is different from the relief valve 20 shown in FIG. 2 in that the third chamber 27 is not in communication with the atmosphere. The relief valve 20 of FIG. 3 also opens the valve according to the differential pressure between the first chamber 25 and the third chamber 27. Thus, the opening pressure of the relief valve 20 is constant regardless of the fluid pressure in the second chamber 26. In the relief valve 20 shown in FIG. 3, the volume of the third chamber 27 becomes smaller and the force effecting in the direction of closing the valve becomes higher when the piston 22 moves rightward. In each of FIG. 2 and FIG. 3, the relief valve 20 further includes O rings 28b and 28c.

Figure 4:
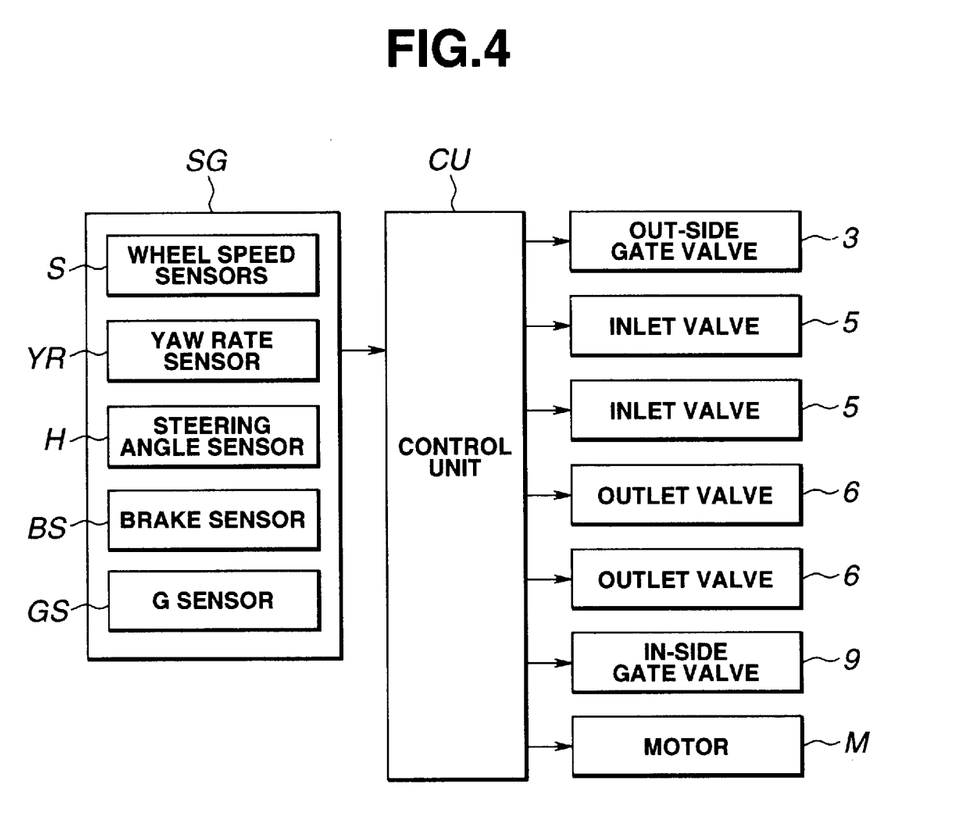
FIG. 4 is a block diagram of the brake control system according to the embodiment of the present invention.

As shown in FIG. 4, the solenoid valves 3, 5, 6 and 9 and the motor M are controlled by a control unit CU. The control unit CU is connected with a sensor group SG comprising wheel speed sensors S detecting a rotational speed of each wheel, a yaw rate sensor YR detecting a yaw rate of the vehicle body, a steering angle sensor H detecting a steering angle of the vehicle body, a brake sensor BS detecting whether a brake is applied or not and G sensors GS detecting the longitudinal and lateral accelerations of the vehicle body. The control unit CU determines a slip ratio of each wheel according to signals derived from the sensor group SG and performs an anti-lock brake control lowering the slip ratio when the slip ratio is higher than a predetermined value during braking. Moreover, the control unit CU performs the motion stabilizing control for stabilizing the vehicle motion when a vehicle behavior is losing stability. In this example, the motion stabilizing control comprises at least one of a torque control controlling a driving wheel slip and a yaw rate control generating a yaw rate for stabilizing the vehicle motion by generating a braking force on one or more predetermined wheels when the unstable tendency of the vehicle behavior increases.

The operation of the braking device according to the present invention is explained. Because the first channel circuit 1 and the second channel circuit 2 have the same operation, a description will be made with regard to the first channel 1 only.

a) Ordinary Brake Operation

Normally, the valves 3, 5, 6 and 9 are out of operation as shown in the drawings. When the brake pedal BP is depressed in this state, the brake fluid pressure generated in the master cylinder MC is transmitted to each wheel cylinder WC by the first channel circuit 1 via the OUT-side gate valve 3, the inlet valves 5 and the branch circuits 1f and 1r, and each wheel cylinder WC applies the braking force corresponding to the depressing force of the brake pedal BP.

b) Anti-lock Brake Control

When one or more wheels are locked or the tendency to lock is increased during brake operation, the control unit CU performs the anti-lock brake control for preventing the wheel locking by holding the slip rate within a predetermined range. The anti-lock brake control decreases, holds and increases the brake fluid pressure in order to prevent wheel locking during braking. When the slip ratio of either or both of the front-left wheel and rear-right wheel exceeds a predetermined value, the anti-lock brake control unit begins driving the motor M, closes the inlet valve 5 and opens the outlet valve 6 of the branch circuit 1r or 1f of the wheel cylinder WC for the locking wheel. Closing of the inlet valve 5 stops a pressure increase in the wheel cylinder WC, the brake fluid of the wheel cylinder WC is discharged to the reservoir 7 through the drain circuit 10 and the braking force is weakened. The brake fluid reserved in the reservoir 7 is sucked by the main pump 4 and is returned into the first channel circuit 1 through the main discharge circuit 4a.

When this reduction in this braking force makes the slip ratio of the wheels become lower than a predetermined value, the control unit CU cuts off power supply to the outlet valve 6, closes the outlet valve 6 and holds the pressure of the wheel cylinder FL or RR. When the slip ratio becomes lower than another predetermined value, the control unit CU cuts off power supply to the inlet valve 5 and opens the inlet valve 5. As a result of this, the brake fluid of the first channel circuit 1 in a high pressure state is supplied to the wheel cylinder WC and the braking force is increased again.

By repeating the above-mentioned operations, the anti-lock brake control system holds the slip ratio of each wheel within the predetermined range to obtain a maximum braking force during stamping of the brake pedal BP while preventing locking of the wheels.

During the anti-lock brake control, the IN-side gate valve 9 is closed. Therefore, the auxiliary pump 8, even if driven by the motor M, can not suck the brake fluid and can not performing its supercharging function.

c) Motion Stabilizing Control

When carrying out the motion stabilizing control such as the torque control controlling the drive wheel slip within a predetermined value during rapid starting operation or rapid accelerating operation or the yaw rate control generating the braking force effecting the yaw rate into a direction of stabilizing the vehicle behavior, the control unit CU drives the motor M and supplies power to the gate valves 3 and 9. Therefore the OUT-side gate valve 3 is closed and shuts off the first channel circuit 1. Instead, the IN-side gate valve 9 is opened and puts the auxiliary suction circuit 8b in the open state. The auxiliary pump 8 sucks the brake fluid from the master cylinder MC and discharges the brake fluid to the auxiliary discharge circuit 8a. Accordingly, the main pump 4 sucks the brake fluid from the auxiliary discharge circuit 8a, and discharges the brake fluid to the main discharge circuit 4a. The inlet valve 5 and the outlet valve 6 increase, hold, decrease the pressure of the wheel cylinder WC and generates a desired optimum braking force.

During the motion stabilizing control, the pressure in the circuit section surrounded by the OUT-side gate valve 3, the inlet valve 5 and the main pump 4 in the first channel circuit 1 becomes higher. Especially when the main pump 4 continues to discharge in the state in which the outlet valve 6 is held closed, the pressure of this circuit section becomes excessively high. When the driver applies a brake during the motion stabilizing control, and the master cylinder pressure becomes higher than the pressure on the downstream side of the OUT-side gate valve 3, the master cylinder pressure opens the one-way valve 1c, and the pressure in that circuit section is increased by transmission of the master cylinder MC pressure.

When the pressure of the downstream side of the OUT-side gate valve 3 thus becomes high and exceeds a predetermined pressure, the relief valve 20 opens and decreases the fluid pressure by returning the brake fluid from the downstream side of the OUT-side gate valve 3 toward the master cylinder MC. If the driver applies the brake, the fluid pressure is generated in the master cylinder MC and the master cylinder pressure is transmitted to the second chamber 26 of the relief valve 20, the valve opening pressure of the relief valve 20 is constant. If the master cylinder pressure remains high because of the driver's depression of the brake pedal, the pressure is not decreased immediately after the opening of the relief valve 20. However, if the brake operation is finished and the master cylinder pressure is lowered, the pressure is relieved through the relief valve 20.

As explained above, in the embodiment of the present invention, the third chamber 27 of the relief valve 20 is an atmospheric or closed gas chamber separated from the second chamber 26 by the O-ring 28a. Therefore, if the driver applies the brake during the motion stabilizing control and the master cylinder pressure is transmitted to the second chamber 26, the valve opening pressure of the relief valve 20 remains unchanged. Thus, the load on the main pump 4 and valves 1c, 1g, 5 and 6 is not increased. It is not necessary to increase the capacity of the motor M, and to increase the pressure tightness of the valves 1c, 1g, 5 and 6. The brake system according to the present invention can prevent an unwanted size increases and cost increase.

The present invention is not limited to the embodiment. For example, the structure of the relief valve 20 arranged in parallel with the OUT-side gate valve 3 is not limited to the structure shown in the drawings. According to the present invention, the valve closing pressure receiving portion (the end of the rod portion 22a) receiving the fluid pressure in the direction of closing the valve of the valve element is exposed in the valve closing chamber (the third chamber 27) which is separated in the fluid-tight manner from the relief circuit.

The illustrated example employs the auxiliary pump 8 for boosting the main pump 4 to provide a quick rise of the fluid pressure during the motion stabilizing control. However, it is optional to omit the auxiliary pump 8. In the illustrated example each fluid pressure control valve comprises the inlet valve 5 and the outlet valve 6. However, it is possible to employ a single valve unit for selectively connecting the wheel cylinder WC with the brake circuit (the first channel circuit 1) or the drain circuit 10.

The valve opening pressure of the relief valve is determined by a differential pressure between the opening valve pressure receiving part receiving the fluid pressure of the relief circuit and the closing valve pressure receiving part free from the fluid pressure of the relief circuit. That is, the closing valve pressure receiving part is not influenced by the fluid pressure of the relief circuit. Therefor, the valve opening pressure can be held constant. Even if the master cylinder pressure is increased during the motion stabilizing control, the valve opening pressure of the relief circuit is not raised. Thus, the loads on the pumps and valves are not increased. The braking system of the present invention is advantageous in system size smaller and manufacturing cost.

What is claimed is:

1. A braking device comprising:
   a fluid pressure source for generating a brake fluid pressure according to a driver's brake operation;
   a brake actuating part for applying a braking force to a wheel by the fluid pressure source generating fluid pressure and transmitting fluid pressure through a brake circuit;
   a fluid pressure control valve, arranged in the brake circuit, capable of decreasing, holding and increasing brake fluid pressure of the brake actuating part;
   a pump for returning brake fluid reserved in a reservoir arranged in a drain circuit in which brake fluid is drained when the fluid pressure of the fluid pressure control valve is decreased into an upstream part of the fluid pressure control valve of the brake circuit;
   a suction circuit for connecting a suction side of the pump with a brake fluid source;
   an IN-side gate valve for opening and closing the suction circuit;
   an OUT-side gate valve, arranged between a discharge position of the pump and the fluid pressure source in the brake circuit, for opening and closing the brake circuit;
   a relief circuit which comprises a relief valve bypassing the OUT-side gate valve, arranged in parallel with the brake circuit, for relieving fluid pressure on the fluid pressure control valve side of the OUT-side gate valve into the fluid pressure source side of the OUT-side gate valve; and
   a control unit for controlling the pump, the fluid pressure control valve, the IN-side gate valve and the OUT-side gate valve;
   wherein the control unit opens the IN-side gate valve, closes the OUT-side gate valve, generates brake fluid pressure by driving the pump regardless of the driver's brake operation, controls the fluid pressure of the brake actuating part by the fluid pressure control valve at a predetermined pressure and performs motion stabilizing control stabilizing a vehicle behavior when a predetermined vehicle behavior is detected;
   wherein the relief valve comprises a valve element for opening and closing the relief circuit by changing from a closing condition in which the valve element abuts on a valve seat to an opening condition in which the valve element is away from the valve seat;
   wherein the valve element comprises an opening pressure receiving part receiving fluid pressure on the fluid pressure control valve's side of the relief circuit in a direction of opening the valve and a closing pressure receiving part receiving pressure in a direction of closing the valve;
   wherein the relief valve further comprises a spring for urging the valve element in a direction of closing the valve; and
   wherein the closing pressure receiving part faces a closing valve chamber separated from the relief circuit in a fluid-tight condition.

2. A braking device as claimed in claim 1 wherein said closing valve chamber is in communication with the atmosphere.

3. A braking device as claimed in claim 1 wherein said closing valve chamber is a closed gaseous chamber.

4. A braking device as claimed in claim 1 wherein said relief valve comprises a cylinder, a first chamber formed in the cylinder and connected with the fluid pressure control valve, a second chamber connected with the first chamber by a small hole and connected with the fluid pressure source of the relief circuit, a piston in the form of the valve element, axially and slidably arranged in said cylinder, for opening and closing said small hole, and the closing valve chamber which is separated by a seal member sealing an outer circumference of the piston, from said second chamber and which is arranged to receive said piston slidably, said second chamber being located axially between said first chamber and said closing valve chamber.

5. The braking device as claimed in claim 4 wherein the opening pressure receiving part and the closing pressure receiving part of the valve element are inseparable parts of the valve element.

6. A vehicle brake system comprising:
   a) a primary unit for displacing hydraulic brake fluid under pressure into a hydraulic brake fluid circuit in accordance with a driver's brake input;
   b) an actuating section for receiving a brake fluid pressure transmitted through the brake fluid circuit from the primary unit and converting the brake fluid pressure into a mechanical force for application of a brake actuating force to a wheel of a vehicle;
   c) a hydraulic pressure control section disposed in a downstream circuit section of the brake circuit, for receiving hydraulic pressure from the primary unit and for decreasing, holding and increasing the brake fluid pressure supplied to the actuating section to control the brake actuating force;
   d) a drain circuit for receiving the brake fluid drained from the pressure control section;
   e) a pump section for returning the brake fluid from the drain circuit to an intermediate circuit section of the brake circuit located between the downstream circuit section of the brake circuit and an upstream circuit section extending between the primary unit and the intermediate circuit section;
   f) a first gate valve disposed in the brake circuit between the intermediate circuit section and the upstream circuit section, for allowing and blocking passage of hydraulic pressure between the upstream and intermediate circuit sections by opening and closing a fluid passage between the upstream and intermediate circuit sections of the brake circuit;
   g) a second gate valve for opening and closing a suction circuit for supplying the brake fluid from the primary unit to the pump section;
   h) a controller section for controlling the brake actuating force by controlling the pressure control section in one of a first control mode in which the first gate valve is in an open state and the second gate valve is in a closed state, and a second control mode in which the first gate valve is in the closed state, the second gate valve is in the open state, and the pump section is driven to supplying the brake fluid under pressure to the intermediate circuit section irrespective of the driver's brake input; and
   i) a relief valve disposed in a relief circuit bypassing the first gate valve, for opening and closing the relief circuit, the relief valve comprising a valve housing defining an opening pressure chamber in fluid communication with the intermediate circuit section and a closing pressure chamber, a valve element for opening the relief circuit to allow the brake fluid to escape through the relief circuit from the intermediate circuit section to the upstream circuit section, bypassing the first gate valve when a pressure difference between a fluid pressure in the opening pressure chamber and a pressure in the closing pressure chamber exceeds a predetermined level, and a biasing element for normally holding the valve element in a closed position to close the relief circuit by urging the valve element in a closing direction, the closing pressure chamber being separated in a liquid-tight manner from the relief circuit.

7. The brake system as claimed in claim 6 wherein the closing pressure chamber is a gas chamber containing a gaseous fluid.

8. The brake system as claimed in claim 6 wherein the valve housing comprises a valve seat separating the opening pressure chamber from a neutral chamber which is in fluid communication with the upstream circuit section on an upstream side of the first gate valve, the valve seat comprising a hole allowing passage of the brake fluid between the opening pressure chamber and the neutral chamber, the valve element comprises a first end which normally closes the hole by abutting on the valve seat by a biasing force of the biasing element, and a second end exposed to a gaseous fluid pressure in the closing pressure chamber.

9. The brake system as claimed in claim 6 wherein the brake system comprises a sensor group for collecting input information on an operating condition of the vehicle and supplying the input information to the controller section, and the controller section achieves an anti-lock brake control on braking by controlling the brake actuation force in the first control mode, and a second vehicle control by controlling the brake actuating force in the second control mode, the second vehicle control being one of a vehicle traction control and a directional behavior control of the vehicle.

10. The brake system as claimed in claim 8 wherein the relief valve further comprises a seal member for separating the closing pressure chamber from the neutral chamber.

11. The brake system as claimed in claim 8 wherein the neutral chamber is located axially between the opening pressure chamber and the closing pressure chamber.

12. The brake system as claimed in claim 8 wherein the valve element has an axial end which is slidably fit in the closing pressure chamber.

13. The brake system as claimed in claim 8 wherein the first and second ends of the valve element are inseparable parts of the valve element.

14. A vehicle brake system comprising:
a) a primary unit for displacing hydraulic brake fluid under pressure into a hydraulic brake fluid circuit in accordance with a driver's input;
b) an actuating section for receiving a brake fluid pressure transmitted through the brake fluid circuit from the primary unit and converting the brake fluid pressure into a mechanical force for application of a brake actuating force to a wheel of a vehicle;
c) a hydraulic pressure control section disposed in a downstream circuit section of the brake circuit, for receiving hydraulic pressure from the primary unit and for decreasing, holding and increasing the brake fluid pressure supplied to the actuating section to control the brake actuating force;
d) a drain circuit for receiving the brake fluid drained from the pressure control section;
e) a pump section for returning the brake fluid from the drain circuit to an intermediate circuit section of the brake circuit located between the downstream circuit section of the brake circuit and an upstream circuit section extending between the primary unit and the intermediate circuit section;
f) a first gate valve disposed in the brake circuit between the intermediate circuit section and the upstream circuit section, for allowing and blocking passage of hydraulic pressure between the upstream and intermediate circuit sections by opening and closing a fluid passage between the upstream and intermediate circuit sections of the brake circuit;
g) a second gate valve for opening and closing a suction circuit for supplying the brake fluid from the primary unit to the pump section;
h) a controller section for controlling the brake actuating force by controlling the pressure control section in one of a first control mode in which the first gate valve is in an open state and the second gate valve is in a closed state, and a second control mode in which the first gate valve is in a closed state, the second gate valve is in an open state, and the pump section is driven to supplying the brake fluid under pressure to the intermediate circuit section irrespective of the driver's brake input; and
i) a relief valve disposed in a relief circuit bypassing the first gate valve, for opening and closing the relief circuit, the relief valve comprising a valve housing defining an opening pressure chamber in fluid communication with the intermediate circuit section, a neutral chamber which is in fluid communication with the upstream circuit section on an upstream side of the first gate valve, and a closing pressure chamber separated in a liquid-tight manner from the relief circuit, a valve element for opening the relief circuit to allow the brake fluid to escape through the relief circuit from the intermediate circuit section to the upstream circuit section, bypassing the first gate valve when a pressure difference between a fluid pressure in the opening pressure chamber and a pressure in the closing pressure chamber exceeds a predetermined level, and a biasing element for normally holding the valve element in a closed position to close the relief circuit by urging the valve element in a closing direction, wherein the valve housing comprises a valve seat separating the opening pressure chamber from the neutral chamber, the valve seat comprising a hole allowing passage of the brake fluid between the opening pressure chamber and the neutral chamber, the valve element comprising a first end which normally closes the hole by abutting on the valve seat by a biasing force of the biasing element and a second end exposed to a gaseous fluid pressure in the closing pressure chamber, and wherein the neutral chamber is formed between the opening pressure chamber and the closing pressure chamber, the valve housing comprises a bore comprising a small bore section defining the closing pressure chamber and a large bore section defining the neutral chamber, the large bore section is formed between the small bore section and the valve seat, and the valve element comprises a piston comprising a large piston section received in the neutral chamber defined by the large bore section, and a small piston section received in the small bore section defining the closing pressure chamber, the biasing element is a spring disposed in the large bore section, and a seal member surrounds the small piston section of the piston.

15. The brake system as claimed in claim 14 wherein the valve housing of the relief valve comprises an air hole for introducing an atmospheric pressure into the closing pressure chamber.

16. The brake system as claimed in claim 14 wherein the closing pressure chamber is a closed gas chamber isolated from an atmospheric pressure.

17. A vehicle brake system comprising:
   a gate valve for putting the brake system in one of first control mode and second control mode; and
   a relief valve disposed in a relief circuit bypassing the gate valve, for opening and closing the relief circuit, the relief valve comprising a valve housing defining an opening pressure chamber in fluid communication with one side of the gate valve, a neutral chamber in fluid communication with the other side of the gate valve and a closing pressure chamber, a movable valve element for opening and closing the relief circuit, and a biasing element for normally holding the valve element in a closed position to close the relief circuit by urging the valve element in a closing direction, the valve element including first and second axial ends moving as a unit along an axial direction, the first end of the valve element facing the opening pressure chamber to receive the pressure in the opening pressure chamber in an opening direction, the second end of the valve element facing the closing pressure chamber to receive the pressure in the closing pressure chamber in the closing direction, the neutral chamber being located axially between the opening pressure chamber and the closing pressure chamber, the closing pressure chamber being a gas chamber which contains a gaseous fluid and which is separated in a liquid-tight manner from the relief circuit.

* * * * *